(12) United States Patent
Hill et al.

(10) Patent No.: US 9,844,898 B2
(45) Date of Patent: Dec. 19, 2017

(54) MIRROR FEATURE IN DEVICES

(75) Inventors: Matthew D. Hill, Mountain View, CA (US); Wayne Wei-Cheng Huang, Cupertino, CA (US); Lee Hua Tan, Singapore (SG); Nicholas Isaac Reid, San Francisco, CA (US); Reid Collins, Valley Center, CA (US); Richard Hung Minh Dinh, Cupertino, CA (US); Ian A. Spraggs, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 13/250,448

(22) Filed: Sep. 30, 2011

(65) Prior Publication Data

US 2013/0084430 A1 Apr. 4, 2013

(51) Int. Cl.
| | | |
|---|---|---|
| *B23B 3/10* | (2006.01) | |
| *H01H 13/14* | (2006.01) | |
| *H01H 13/83* | (2006.01) | |
| *B29C 45/00* | (2006.01) | |
| *B29C 45/16* | (2006.01) | |

(52) U.S. Cl.
CPC .......... *B29C 45/0053* (2013.01); *H01H 13/14* (2013.01); *B29C 45/16* (2013.01); *B29C 2045/0079* (2013.01); *B29K 2995/003* (2013.01); *B29K 2995/0025* (2013.01); *B29K 2995/0026* (2013.01); *H01H 2219/06* (2013.01); *H01H 2221/07* (2013.01); *H01H 2229/006* (2013.01); *H01H 2229/008* (2013.01);
(Continued)

(58) Field of Classification Search
CPC .. B32B 3/00; B32B 3/10; B32B 3/263; B32B 3/30; B32B 2307/416; B29K 2995/003; B29K 2995/0025; Y10T 428/24612; H01H 13/14; H01H 2219/06; H01H 2221/0702; H01H 2221/07; H01H 2219/006; H01H 13/83; H01H 2233/07
USPC .... 428/66.5, 138, 912.2, 42.1, 542.2, 913.3; 200/310, 313, 314, 341, 308
See application file for complete search history.

(56) References Cited

U.S. PATENT DOCUMENTS 1,608,108 A 11/1926 Martus et al.
2,340,988 A * 2/1944 Ryder .................... G02B 5/126
248/27.3
(Continued)

FOREIGN PATENT DOCUMENTS

CN 201945987 8/2011
CN 102725663 10/2012
(Continued)

OTHER PUBLICATIONS

Jaeger, Color Solid Ink Printing, imaging.org-Online, 2014.*

*Primary Examiner* — Joanna Pleszczynska
(74) *Attorney, Agent, or Firm* — Brownstein Hyatt Farber Schreck, LLP

(57) ABSTRACT

Various processes for creating mirrored features are discussed herein as well as devices that include the mirrored features. One embodiment includes a button having a transparent layer and an opaque layer coupled to the transparent layer. A portion of the transparent layer extends through the opaque layer so that the portion of the transparent layer is flush with a back surface of the opaque layer and generally has a shape of a desired feature. The button also includes a reflective object positioned so that it may be seen through the transparent layer.

26 Claims, 20 Drawing Sheets

(52) U.S. Cl.
CPC . *H01H 2229/036* (2013.01); *H01H 2229/046* (2013.01); *Y10T 428/24612* (2015.01)

(56) References Cited

U.S. PATENT DOCUMENTS

| | | | |
|---|---|---|---|
| 2,341,960 A * | 2/1944 | Tabellione | G02B 5/12 |
| | | | 359/545 |
| 2,473,848 A | 8/1947 | Baxter | |
| 2,821,589 A | 1/1958 | Needham | |
| 3,123,792 A | 3/1964 | Klemm | |
| 3,471,663 A | 10/1969 | Farrell | |
| 3,982,917 A | 9/1976 | Upton | |
| 4,227,059 A | 10/1980 | Ogawa | |
| 4,340,791 A | 7/1982 | Sorenson | |
| 5,180,051 A | 1/1993 | Cook et al. | |
| 5,214,530 A | 5/1993 | Coombs et al. | |
| 5,215,864 A | 6/1993 | Laakmann | |
| 5,327,201 A | 7/1994 | Coleman et al. | |
| 5,496,977 A | 3/1996 | Date et al. | |
| 5,523,125 A | 6/1996 | Kennedy et al. | |
| 5,607,607 A | 3/1997 | Naiman et al. | |
| 5,718,326 A * | 2/1998 | Larose | H01H 13/14 |
| | | | 200/314 |
| 5,936,213 A | 8/1999 | Biquez et al. | |
| 6,040,543 A | 3/2000 | Mina et al. | |
| 6,084,190 A * | 7/2000 | Kenmochi | 200/341 |
| 6,196,738 B1 * | 3/2001 | Shimizu | H01H 13/705 |
| | | | 200/314 |
| 6,201,196 B1 | 3/2001 | Wergen | |
| 6,565,770 B1 | 5/2003 | Mayer et al. | |
| 6,591,457 B1 * | 7/2003 | Howie, Jr. | 16/441 |
| 6,630,635 B1 | 10/2003 | Doepner | |
| 6,667,450 B2 | 12/2003 | Bulin et al. | |
| 6,707,358 B1 | 3/2004 | Massman | |
| 6,762,381 B2 | 7/2004 | Kunthady et al. | |
| 7,101,603 B2 | 9/2006 | Okamura et al. | |
| 7,165,846 B2 | 1/2007 | Sannohe | |
| 7,297,221 B2 | 11/2007 | Hikita | |
| 7,414,213 B2 | 8/2008 | Hwang et al. | |
| 7,531,765 B2 * | 5/2009 | Komagata | 200/314 |
| 7,727,618 B2 | 6/2010 | Iwano | |
| 8,003,200 B2 | 8/2011 | Nashiki et al. | |
| 8,198,626 B2 | 6/2012 | Lee et al. | |
| 8,222,773 B2 | 7/2012 | De Iuliis et al. | |
| 8,232,502 B2 | 7/2012 | Young et al. | |
| 8,529,775 B2 | 9/2013 | Costin et al. | |
| 8,640,413 B2 | 2/2014 | Ruggie et al. | |
| 8,802,220 B2 | 8/2014 | Cao et al. | |
| 8,867,320 B2 | 10/2014 | Suzuki et al. | |
| 8,882,280 B2 | 11/2014 | Fukaya et al. | |
| 9,629,271 B1 | 4/2017 | Lancaster-Larocque et al. | |
| 2005/0287301 A1 | 12/2005 | Ljubomirsky | |
| 2006/0024476 A1 | 2/2006 | Leland et al. | |
| 2008/0035460 A1 * | 2/2008 | Hwang et al. | 200/341 |
| 2009/0166343 A1 | 7/2009 | Lappalainen et al. | |
| 2009/0237782 A1 | 9/2009 | Takamatsu et al. | |
| 2010/0026656 A1 | 2/2010 | Hotelling et al. | |
| 2011/0109590 A1 | 5/2011 | Park et al. | |
| 2011/0177300 A1 | 7/2011 | Hankey et al. | |
| 2012/0103778 A1 | 5/2012 | Obata et al. | |
| 2012/0328905 A1 | 12/2012 | Guo et al. | |
| 2013/0098191 A1 | 4/2013 | Manullang et al. | |
| 2013/0112536 A1 | 5/2013 | Shah et al. | |
| 2013/0120314 A1 | 5/2013 | Ishibashi et al. | |
| 2013/0140746 A1 | 6/2013 | Heverly et al. | |
| 2014/0363608 A1 | 12/2014 | Russell-Clarke et al. | |
| 2015/0062709 A1 | 3/2015 | Matsuyuki et al. | |
| 2015/0064432 A1 | 3/2015 | Matsuyuki et al. | |

FOREIGN PATENT DOCUMENTS

| | | |
|---|---|---|
| CN | 202632259 | 12/2012 |
| CN | 202649955 | 1/2013 |
| CN | 202854790 | 4/2013 |
| CN | 203366304 | 12/2013 |
| CN | 103902122 | 7/2014 |
| CN | 204242152 | 4/2015 |
| DE | 102010006665 | 8/2011 |
| EP | 0424173 | 4/1991 |
| GB | 581824 | 10/1946 |
| GB | 957644 | 5/1964 |
| JP | H0593811 | 4/1993 |
| JP | 201263839 | 3/2012 |
| JP | 201410814 | 1/2014 |
| KR | 1020090131944 | 4/2010 |
| TW | M414616 | 10/2011 |
| TW | 201231792 | 8/2012 |
| WO | WO01/34408 | 5/2001 |
| WO | WO2011/076294 | 6/2011 |

* cited by examiner

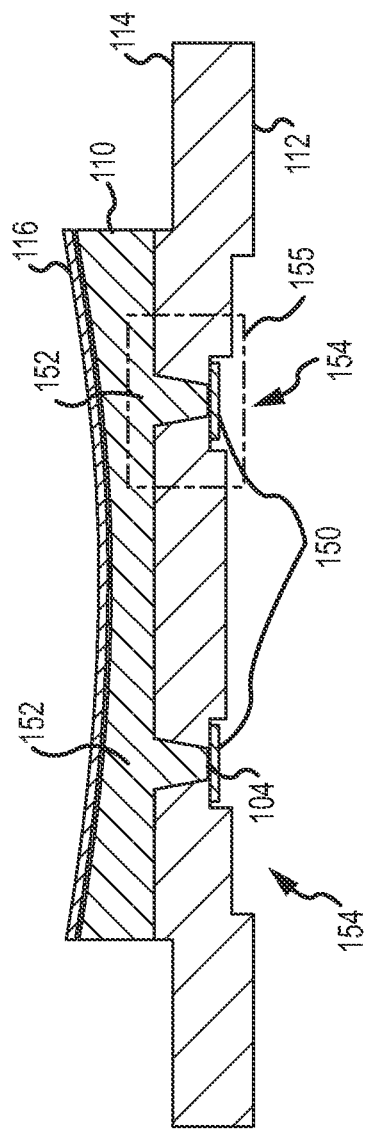

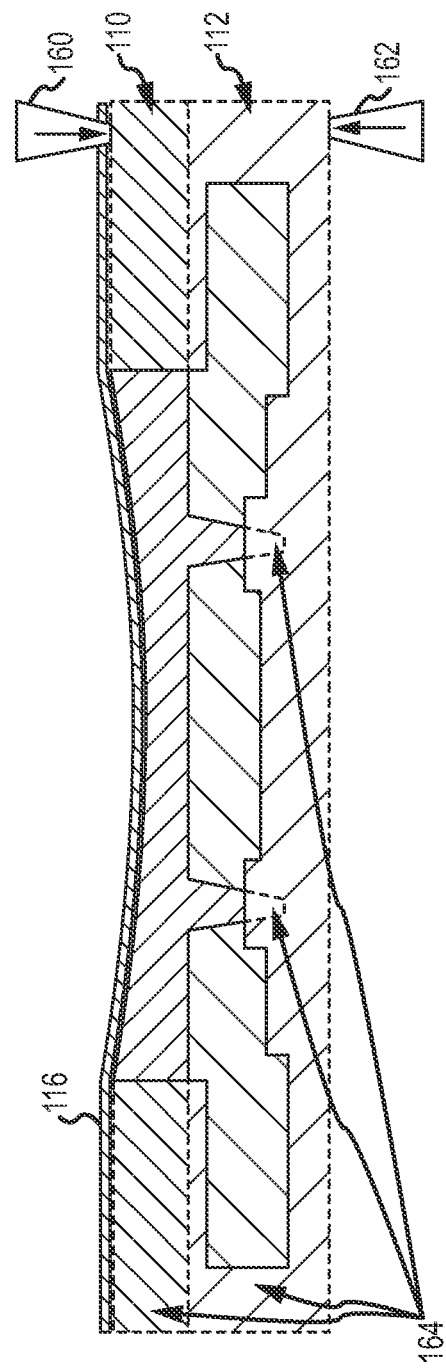

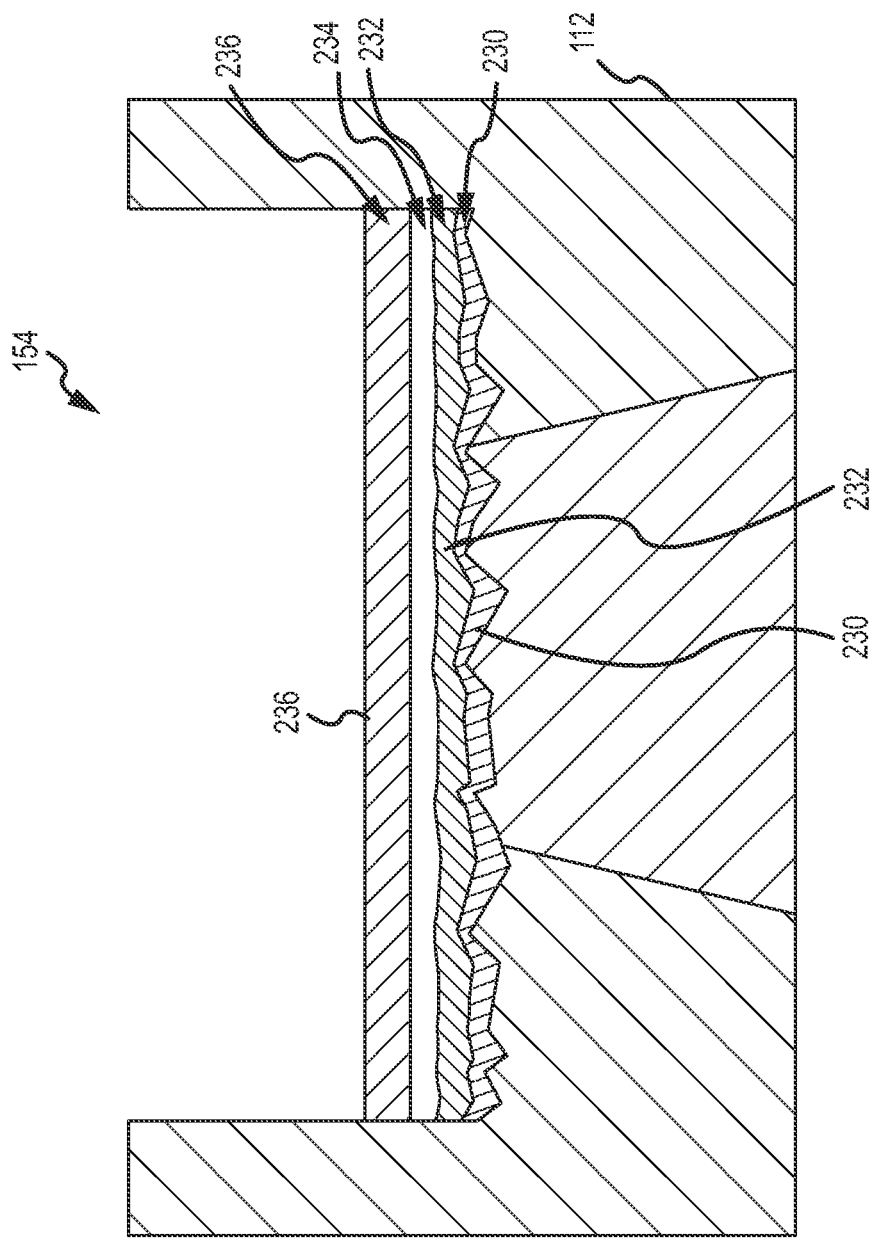

MIRROR FEATURE IN DEVICES

TECHNICAL FIELD

The present application generally relates to devices with intricate features and, more particularly, to a method of manufacturing such devices to provide the features with a reflective, mirrored, shiny, and/or high gloss finish.

BACKGROUND

Consumer electronics constitute a continually growing sector in the marketplace. Items such as cellular phones, smart phones, notebook computers, tablet computers, media players, and so forth are so popular they are nearly ubiquitous and nearly a necessity for today's lifestyles. In addition to the performance and functionality of the devices, the appearance of the electronic devices can be a large selling point for consumers. Indeed, the appearance of certain devices including their shape, colors, size and so forth can become iconic in popular culture. As such, the electronic device manufactures are continually pushing to create new and different features that appeal to the consumers' visual and aesthetic tastes. Challenges arise, however, due to the materials used for the devices and, in some instances, small form factors, among other things.

SUMMARY

Embodiments discussed herein include devices and products having a mirrored feature and methods related thereto. One embodiment may take the form of a button having a transparent layer and an opaque layer coupled to the transparent layer. A portion of the transparent layer extends through the opaque layer so that the portion of the transparent layer is flush with a back surface of the opaque layer and generally has a shape of a desired feature. A reflective object or coating is positioned so that it may be seen through the transparent layer.

Another embodiment may take the form of a button having an opaque layer. The opaque layer includes a plurality of distinct regions that may be formed with independent gates. The button also has a transparent layer coupled to the opaque layer. A portion of the transparent layer extends through the opaque layer so that a back surface of the transparent layer is flush with a back surface of the opaque layer and generally has a shape of a desired feature. One or more mirror coating layers are positioned so that the mirror coating may be seen through the transparent layer.

Yet another embodiment includes a method of manufacturing including forming a unitary member by a multishot molding process. The unitary member includes an opaque layer and a transparent layer positioned adjacent to the opaque layer. A portion of the transparent layer extends through the opaque layer. The method also includes removing excess material of the opaque and transparent layers to achieve a desired geometry and applying a mirror coating over the portion of the transparent layer that extends through the opaque layer so that a mirror feature may be seen through the transparent layer.

Still another embodiment may take the form of a method of manufacturing including performing a multishot injection mold process to create a multilayer member. The multishot process includes forming a transparent layer through operation of a first gate, forming an opaque layer through operation of a second gate. The opaque layer is positioned adjacent to the first layer. The multishot process also includes forming an island member through operation of a third gate. A mold for the island member abuts a portion of the transparent layer and a portion of the opaque layer so that the island member is positioned adjacent to the first layer and is co-planar with the opaque layer. The opaque layer extends about the periphery of the island member and the opaque layer and island member are separated by a groove formed by the mold. The method of manufacturing further comprises applying a hardcoat layer over the first layer and removing excess portions of the hardcoat layer, first layer, second layer and island member to create a desired geometry. A mirror ink is applied in the groove.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

BRIEF DESCRIPTION OF THE DRAWINGS

FIG. 4A illustrates the cross-sectional view of the button of FIG. 2 taken along line A-A after removal of overmold material.

FIG. 5 illustrates a cross-sectional view of the button with gates for molding the layers of the button, as well as portions of the layers that are removed through a computer numeric code process.

FIG. 17 illustrates clear ink filling in rough textures of a surface to smooth the surface prior to printing ink on the surface.

DETAILED DESCRIPTION

Figure 1:
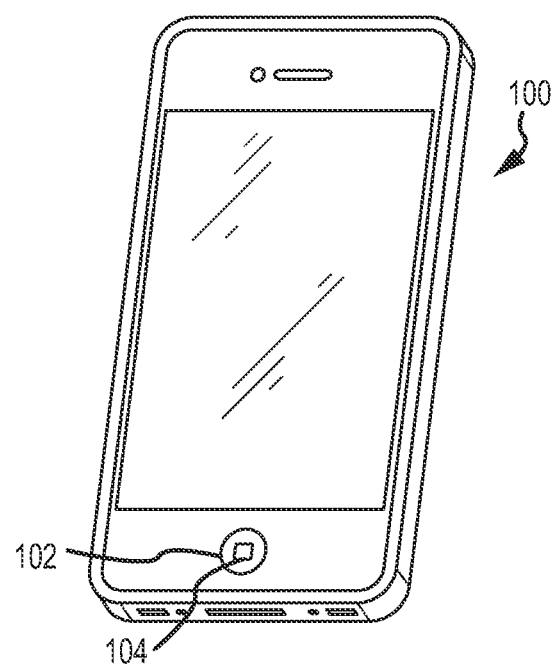
FIG. 1 illustrates an example electronic device having a mirror feature.

A mirror and/or high polish feature for products is discussed herein along with related methods for creating the mirror feature. Generally, the terms "mirror feature," "mirror," "high polish feature" and the like refer to reflective surfaces or highly reflective surfaces that that have the shape of a desired feature, icon, symbol, or the like. The mirror feature may be implemented as part of a product housing or as discrete components of a product. For example, the mirror feature may be integrated with a button of a computing device. One embodiment may take the form of a multilayer plastic button for an electronic device that includes the mirrored feature. At a high level, the manufacturing process for the button may include three steps: 1) creating a button with desired dimensions, 2) generating a smooth surface suitable for the mirrored finish, and 3) applying the mirror finish.

The multilayer plastic button may initially be formed through a molding process, such as a multishot injection molding process, which combines a transparent layer with an opaque layer. The mirror feature may be viewed through the transparent layer. The opaque layer generally may be opaque and portions of the transparent layer may extend through the opaque layer. The portions extending through the transparent layer may generally have the shape of the desired feature. The mirror feature may be positioned behind the opaque layer. That is, the mirror feature may be printed on the back of the transparent layer. In other embodiments, the mirror feature may be located with an aperture of the opaque layer. In still other embodiments, the mirror feature may be positioned between the transparent layer and the opaque layer.

In some embodiments, a portion of the opaque layer may be removed to expose the transparent layer. The removal of the portion of the opaque layer may leave a textured surface. Specifically, the exposed surface of the transparent layer that extends through the opaque layer and the exposed adjacent areas of the opaque layer are the textured surface. The textured surface may not provide a suitable surface for the mirror feature. That is, the texture may not be suitable for pad-printing mirror ink or other application of a reflective material without non-uniformities, such as cracks and/or other undesirable characteristics, being visible in the mirror feature. Additionally, in some cases, due to small sizes and/or intricate contours of the mirror feature, polishing of the textured surface may not be technically or operationally feasible or may not render suitable results. Accordingly, a layer of clear ink or lacquer may be applied over the textured surface before application of the mirror ink or a high polish ink.

Further, the removal of a portion of the opaque layer forms an aperture within which the mirror feature may be located. To prevent the clear ink and mirror ink from being attracted to the sidewalls of the aperture (and providing yet another source for non-conformity in the mirror layer), a space may be provided between the sidewalls and the ink layers.

In other embodiments, a back surface of the opaque layer and the portion of the transparent layer that extends through the opaque layer may be substantially co-planar or flat. In which case, the back surface may be polished and or treated to substantially remove textures therefrom. Additionally, the mirror layer may be a mirrored sheet or structure, such as a mirrored foil sheet and the mirror layer may be applied with a clear adhesive to the back surface of the opaque layer. In some cases, the adhesive may have cutouts that, when the adhesive is applied, align with the portions of the transparent layer that extend through the opaque layer. It should be appreciated that embodiments with a substantially flat back may be thicker than those where the mirror layer is positioned in a cutout of the opaque layer. That is, the addition of the mirror layer (and any other layers) within an aperture of the opaque layer typically do not add to the thickness of the button, insofar as the mirror layer generally does not fill the machined aperture in the opaque layer. Therefore, embodiments formed in this fashion may be thinner than a button where the mirror feature is simply adhered to the back surface of the opaque layer.

Turning to the drawings and referring initially to FIG. 1, an electronic device 100 is shown in which a mirrored feature may be implemented. In particular, the electronic device 100 includes a button 102 in which a mirror feature 104 is provided. As shown, the mirror feature 104 may take the form of a square with rounded corners. It should be appreciated, however, that the mirror feature 104 may take any suitable form including other geometric shapes, icons, and so forth. Additionally, it should be appreciated that the mirror feature 104 may be provided in other parts and/or discrete components of the electronic device 100 or other devices and/or their housings to achieve a desired aesthetic appearance. Further, the electronic device 100 can be a media player, a smart phone, a tablet computing device, a notebook computer, a desktop computer, or other such devices.

Figure 2:
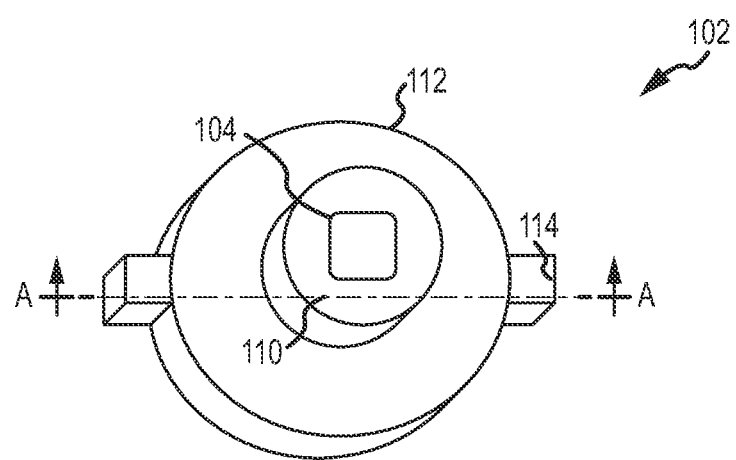
FIG. 2 illustrates a button of the electronic device of FIG. 1 in which the mirror feature is integrated.

FIG. 2 illustrates the button 102 independent of the electronic device. In some embodiments, the button 102 may be formed of multiple plastic layers. In particular, the button 102 may include two main structures, namely a top layer 110 and a bottom layer 112. The top layer 110 may take the form of a generally transparent layer and, as such, may be referred to herein as the "transparent layer." Typically, the transparent layer 110 may be externally exposed from the housing of the device and which the user may see and/or with which the user may interact. The bottom layer 112 may be referred to as an "opaque layer" and may include features which interconnect with the housing and/or hold the button 102 in place with in the housing. For example, the opaque layer may include couplers, such as flanges 114, to couple the button with a housing or other support mechanism and as such may be referred to as a "structural layer" or "support layer". Typically, the opaque layer 112 may be opaque. In other embodiments, the opaque layer 112 may be a colored layer and the colors of the opaque layer may be visible to a user through the transparent layer 110.

The mirror feature 104 is visible through the transparent layer 110 of the button 102. The mirror feature 104 may be positioned within an aperture formed in the back of the opaque layer 112 or, in some embodiments, may be layered across the back of the opaque layer, as will be discussed in detail below. In still other embodiments, the mirror feature 104 may be positioned between the transparent layer and the opaque layer.

Figure 3:
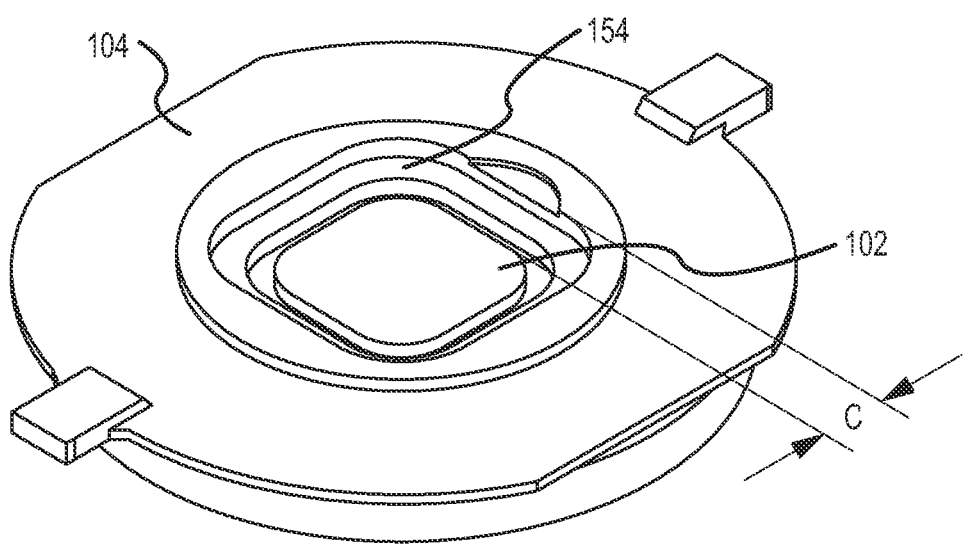
FIG. 3 illustrate an underside of the button of FIG. 2.

FIG. 3 illustrates an underside view of the button 102. In some embodiments, an aperture 154 is cut into the button 102 to allow for placement of the mirror feature 104. In other embodiments, the aperture 154 may be formed during molding. In still other embodiments, the underside of the button may be flat or planar. In some embodiments, the aperture 154 may be less than 1.5 mm wide and less than 5 mm square. These dimensions may vary in other embodiments. Continuing with the present example, the width of the machined groove may be between 1.0 and 1.4 mm wide (e.g., width C may be approximately 1.2 mm wide) in some embodiments. The machined area 152 may have rounded corners, as shown, may be circular in shape, or may take any other geometric, or icon shape. Further, in certain embodiments the depth of the aperture 154 may be less than 0.05 mm. For example, in some embodiments, the aperture 154 may be between 0.01 and 0.03 mm (e.g., approximately 0.02. mm) deep.

FIG. 4A illustrates a cross-sectional side view of the button 102 taken along line A-A in FIG. 2. In FIG. 4A, a hardcoat 116 is shown over the transparent layer. The hardcoat 116 may generally provide a scratch resistant surface for the button 102. Further, as may be seen, the transparent layer 110 has portions that extend through the opaque layer 112 and over which ink layers 150 (including the mirror feature) are positioned. The mirror feature 104 is positioned adjacent the portion 152 of the transparent layer 110 that extends through the opaque layer 112 so that it may be seen through the transparent layer when the button 102 is installed in the electronic device 100.

Figure 4B:
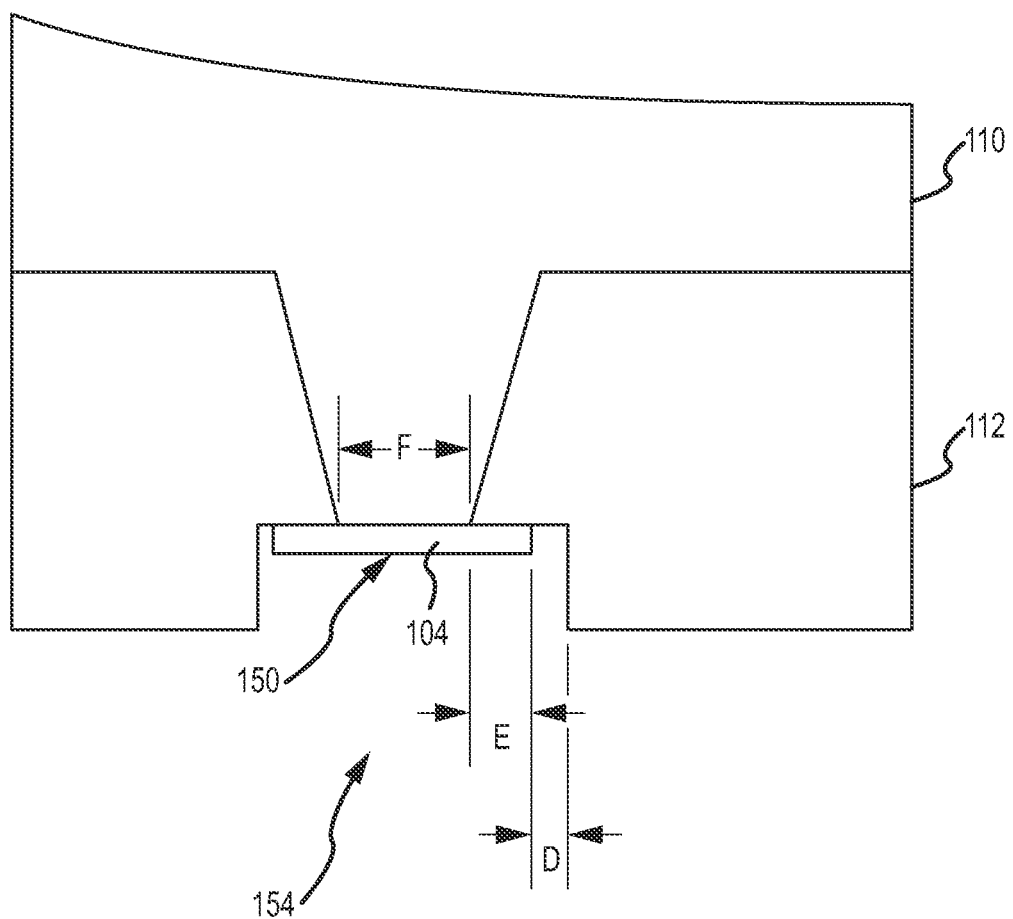
FIG. 4B is a zoomed view of a portion of the cross-sectional view of FIG. 4A

FIG. 4B is a zoomed view of section 155 in FIG. 4, showing the 104 mirror feature formed by ink layers 150 in the aperture 154. Generally, the ink layers 150 may be separated from the sidewalls of the aperture (or groove) 154 by a distance D. For example, in one embodiment, the ink layers 150 may be separated approximately 0.1 mm from the sidewalls of the aperture 154. This distance helps to prevent distortion of the ink layers that may occur due to interference by the sidewalls of the groove. Further, the ink may cover a portion of the transparent layer 110 that extends through the opaque layer 112 and may optionally cover a portion of the opaque layer. In some embodiments, the ink layers 150 may extend a distance E over the opaque layer 112; this distance may be between approximately 0.05 mm and 0.15 mm. In one embodiment, the ink layers 150 may extend approximately 0.1 mm over the opaque layer. This extension of the ink layers 150 helps to ensure that the visible portion of the ink layers is consistent and smooth.

The ink layers 150 (e.g., the mirror layer) are visually constrained by the portion of the transparent layer 110 that extends through the opaque layer 112. That is, the mirror feature 104 is only visible insofar as the transparent layer 110 and opaque layer 112 are configured to allow it to be seen, as determined by the surface area of the transparent layer that is co-planar with and exposed at the back of the opaque layer where the ink layers are positioned.

That is, a width F of the transparent layer over which the ink layers are applied define the size of the mirror feature seen by a user. This width is generally defined during the molding process by the mold and may be any suitable size. In some embodiments, the width is between approximately 0.2 mm and 0.5 mm. In one embodiment, in particular, the width may be between approximately 0.3 mm and 0.4 mm (e.g., approximately 0.35 mm).

The transparent and opaque layers may be molded in a multishot, injection molding process after which material is removed until the button 102 has the desired geometry. For example, FIG. 5 illustrates a first gate 160 for a first shot creating the transparent layer 110 and a second gate 162 for a second shot creating the opaque or opaque layer 112. Generally, in multishot processes, a mold may have multiple cavities that are sequentially filled with unique resins. After the first cavity is filled with a first resin to form a first layer (e.g., the transparent layer 110), a portion of the first layer is used as a substrate for the second cavity and the second cavity is filled with the second resin to form the second layer (e.g., opaque layer 112).

After the molding process, a hardcoat 116 may be applied over the transparent layer 110 and excess material is removed to achieve the desired geometry. For example, computer numerical code (CNC) may be used to remove portions 164 of the transparent layer 110, the opaque layer 112 and the hardcoat 116, and to create the groove 154 in the opaque layer into which the mirror feature will be situated. As such, the button 102 may be created through the following steps: 1) mold the transparent layer 110 by filling a first cavity of a mold, 2) mold the opaque layer 112 by filling a second cavity of the mold and using the transparent layer as a substrate for the second cavity, 3) paint top surface with a hardcoat 116, and 4) remove excess material (e.g., via a CNC process) from the hardcoat, transparent layer, and opaque layer to expose icon geometry. After the desired geometry is achieved, a surface in the groove 154 on which the mirror feature will be placed is smoothed so that the mirror feature may be free from defects.

Figure 6:
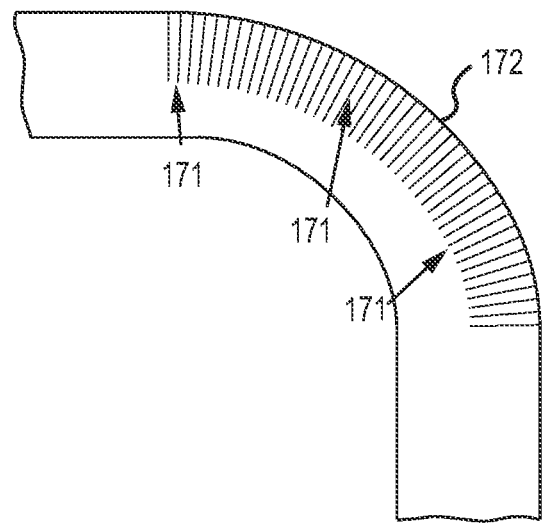
FIG. 6 illustrates cutter marks on a surface in an aperture of the button of FIG. 2.
Figure 7:
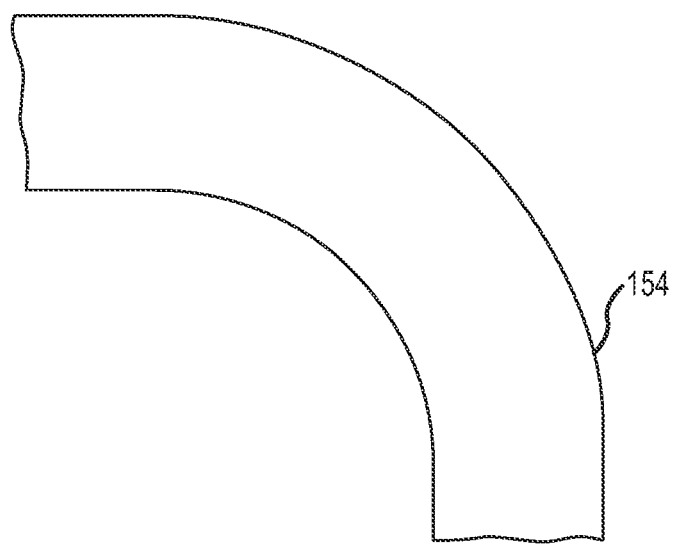
FIG. 7 illustrates a surface in the aperture of the button of FIG. 2 without visible cutter marks.

In some embodiments, the surface in the groove 154 may be smoothed by a CNC process. In one embodiment, the speed and feed rate of the CNC tool may be adjusted to find a suitable combination for the particular material/plastic that is being cut to improve the surface quality so that cutter marks are not visible. In some cases, for example, the feed rate may be set within a range of approximately 15-1000 mm/min and the speed set within the range of approximately 10,000-20,000 RPM, for example. Generally, an increased revolutions per minute (RPMs) and a decreased feed rate provides a better finish. In one embodiment, in particular, the speed may be set to approximately 10,000 RPMs and the feed set to approximately 25 mm/min. FIG. 6 illustrates a groove 172 cut under operating speeds and feed rates that do not provide a suitable appearance, as cutter marks 170 are generally visible. In contrast, FIG. 7 shows the groove 154 cut with the higher speeds and lower feed rates, and cutter marks are generally not visible In some embodiments, diamond cutters may be used to cut the groove 154 and improve the surface finish. In particular, a diamond coated end mill, two or four flute cutter may be used such as those available from Precision Machine Tooling, for example.

Figure 8:
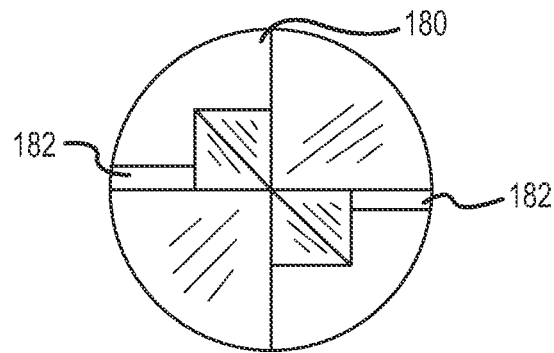
FIG. 8 illustrates a cutting tool for use in a lathe or fly-cutting process to form a smooth surface in the aperture.
Figure 9:
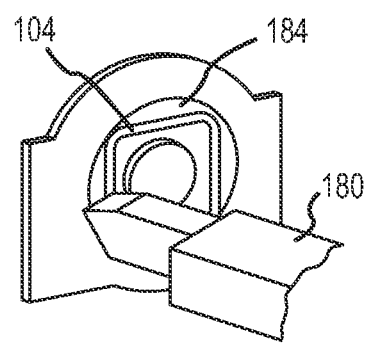
FIG. 9. illustrates a cut made using the tool of FIG. 8.
Figure 10:
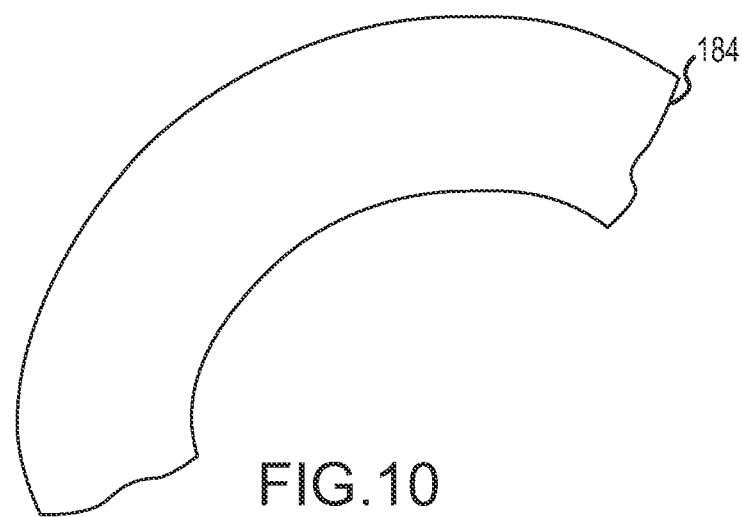
FIG. 10 illustrates a surface of an aperture after cutting by the tool of FIG. 8.

In still another embodiment, a lathe or "fly-cut" may be implemented. FIG. 8 illustrates the cutting tool 180 used in the lathe or fly-cut process looking directly at the blades 182 from an axial position. As illustrated, the cutting tool 180 has multiple cutting surfaces (blades) 182. This is similar in concept to using a single, large high-sharpness blade to plane the icon surface. The blades 182 can rotate (fly-cutter) or the button may rotate (lathe). In the lathe or fly-cut process, the dimensions of the groove 154 may change to enable simpler and/or higher quality surface machining as it forces a circular cutting path 184 shown in FIG. 9. That is, forming a circular groove may prove easier and provide better surface finish that trying to use the lathe or fly-cut to form a square groove with rounded corners. FIG. 10 illustrates the groove 184 as being circular when cut using the lathe or fly cutter process.

A smooth surface may also be obtained by a secondary process that improves an imperfect surface (e.g., a surface that has a texture or visible cutting marks). In some embodiments, a localized heating and re-melting of the surface may be implemented. In other embodiments, chemical polishing or mechanical polishing may be implemented. In still other embodiments, the surface may be covered with material (e.g., a clear ink) that provides a smooth surface.

Figure 11A:
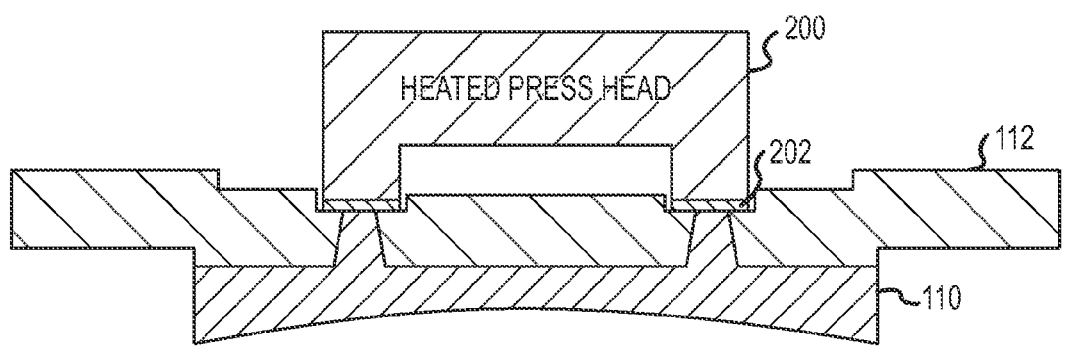
FIG. 11A illustrates a heated press head re-melting a surface to smooth the surface.
Figure 11B:
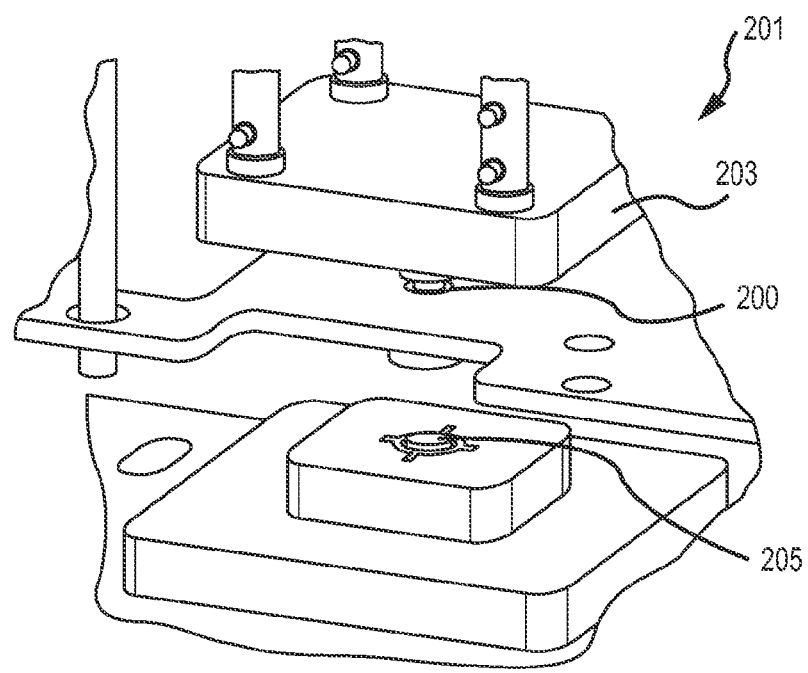
FIG. 11B illustrates the heated press.

The localized heating and re-melting of the surface may include hot pressing, hot foil pressing, or ultrasonic processes. FIG. 11A illustrates hot pressing. Generally, in hot pressing a heated iron or head 200 is pressed against the surface 202 of the icon to transfer heat from the heated head to the surface and re-melt the surface. The heated head 200 may be designed to match with the desired icon feature (mirror feature). The re-melting of the surface 202 improves its smoothness so that a mirror feature may be applied thereon. FIG. 11B illustrates the hot stamping press 201 as including a heat generator 203 in which the heated head 200 is positioned. The heat generator 203 is used to heat the heated head 200 may be made of the same material as the heated head (e.g., copper, steel, and/or chromium are some examples). The heated head 200 may be heated to temperatures between approximately 150-190 degrees Celsius by the heat generator 203. The heat generator 203 and the heated head 200 are pressed against the button 102 which is positioned in a holding slot 205.

Figure 12A:
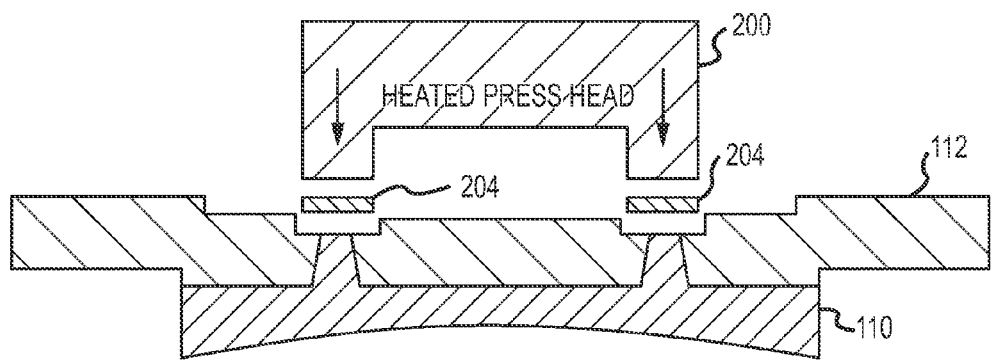
FIGS. 12A-12B illustrate a hot foil pressing process.
Figure 12B:
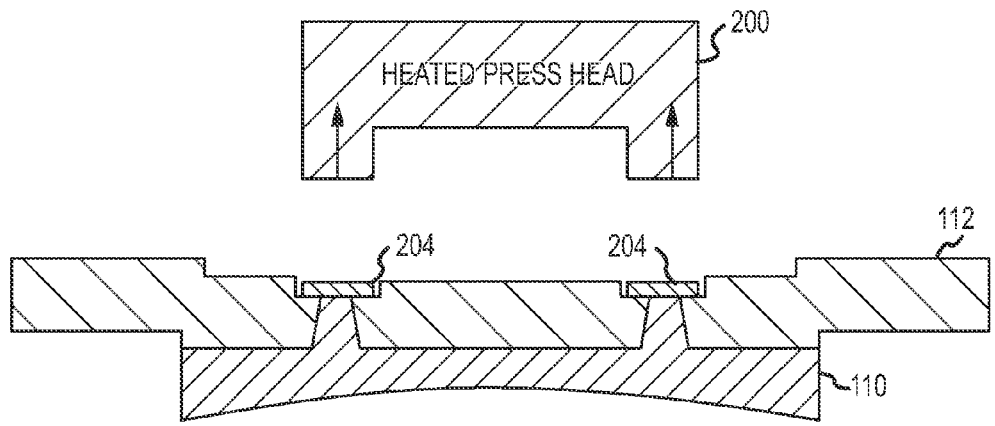

FIG. 12A illustrates hot foil pressing process. Hot foil pressing is similar to the hot pressing process, in that it utilizes the heated head 200. Additionally, however, a thin high polish metal insert 204 (foil or sheet metal) is embedded in the plastic by the heated head. The insert is left embedded in the plastic (FIG. 12B) and provides mirror finish as well as preventing the plastic from sticking to the heated head 200.

Figure 13:
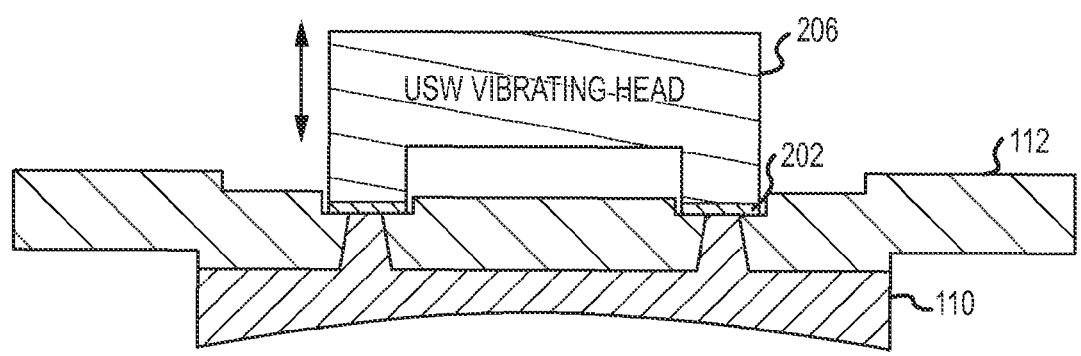
FIG. 13 illustrates an ultrasonic process for creating a smooth surface.

The ultrasonic process is illustrated in FIG. 13. Generally, an ultrasonic weld vibrating head 206 may be applied to the surface 202. The ultrasonic weld vibrating head 206 vibrates to mechanically compact and re-melt the surface 202 with vibration. In each process, localized melting of the surface helps to smooth the surface for the mirror feature.

Figure 14:
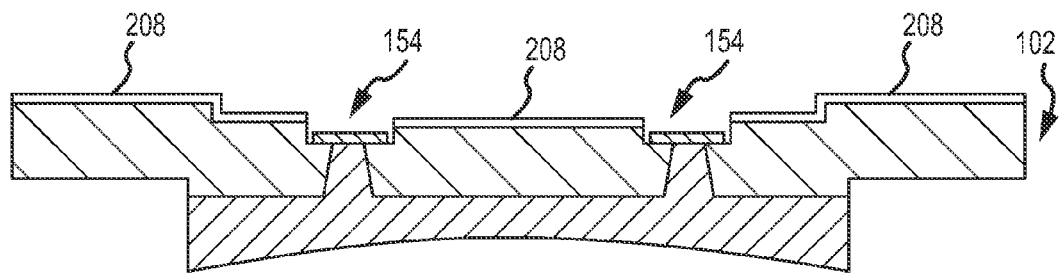
FIG. 14 illustrates the button having a surface in the groove exposed and other surfaces masked.
Figure 15:
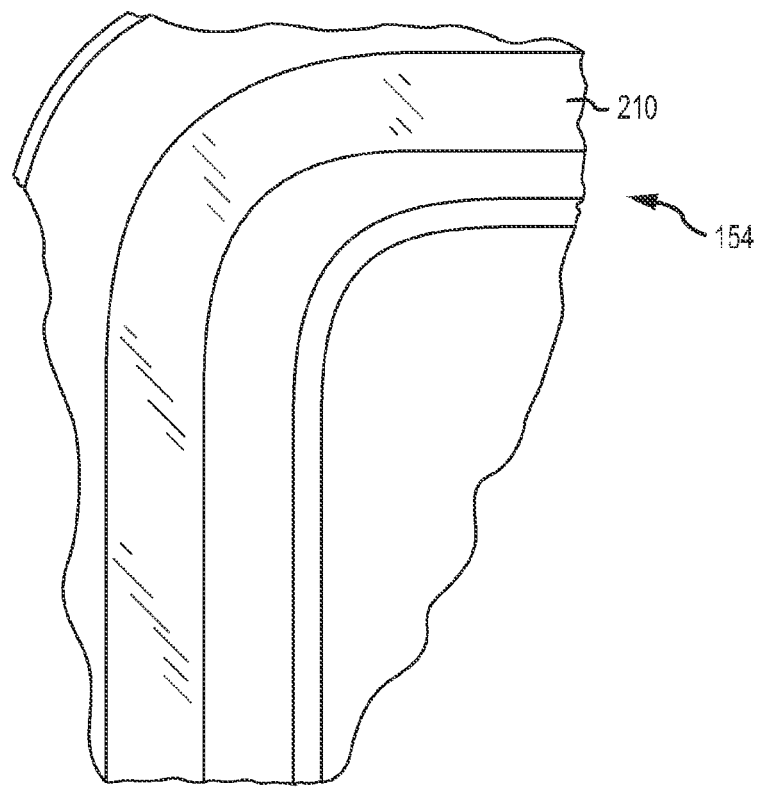
FIG. 15 illustrates a vapor polished surface.

In chemical polishing, a vapor polish may be created by exposing the rough surface of the groove 154 to a corrosive chemical vapor. FIG. 14 illustrates the button 102 with surface of the groove 154 exposed and other surfaces covered with a mask 208. The masking prevents the masked surfaces from being exposed to the chemical vapors. FIG. 15 illustrates the vapor polish 210 achieved by the chemical polishing. Generally, the surface finish is relatively smooth, but masking the surface may be difficult.

Figure 16A:
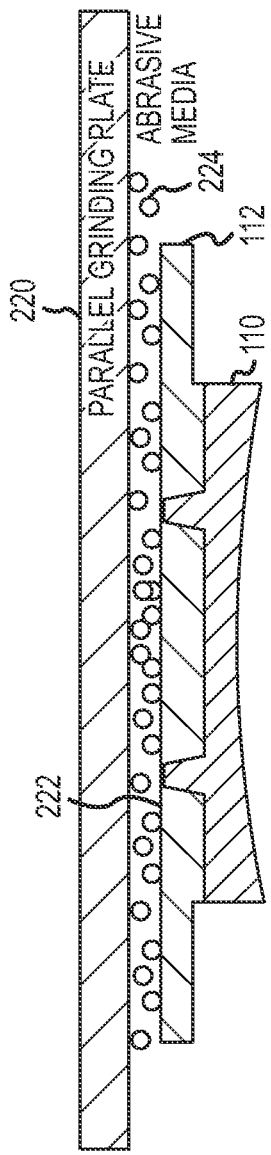
FIG. 16A illustrates a lapping process for smoothing our a planar surface.
Figure 16B:
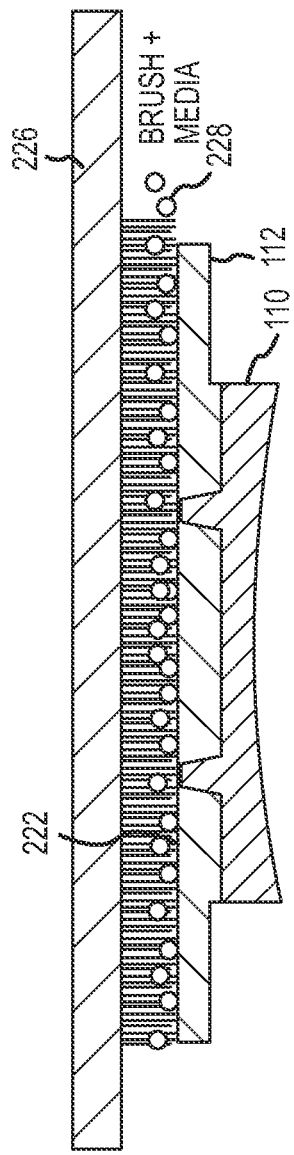
FIG. 16B illustrates polishing of the planar surface of FIG. 16A.

Mechanical polishing may generally be utilized when the button has a flat back surface 222 (e.g., there is no groove). Polishing actions may include any or all of grinding, lapping and polishing. FIG. 16A illustrates a grinding plate 220 that is parallel to the flat back surface 222 with an abrasive media 224 positioned therebetween. The abrasive media 224 smoothes the back surface 222 in a lapping process. Subsequently, a polishing brush 226 with media 228 is used to polish the back surface 222, as shown in FIG. 16B.

FIG. 17 illustrates application of one or more layers of clear liquid ink or curable resin 230, 232, 234 to the rough surface 202 to provide a smooth surface for mirror ink application. The liquid ink fills in valleys and grooves in the surface, smoothing it. That is, as each layer of clear liquid ink is applied, the texture is further smoothed. The clear ink may be printed on the surface 202. Once sufficiently smooth, a mirror ink layer may be applied over the clear liquid ink layers 230, 232, 234.

Figure 18:
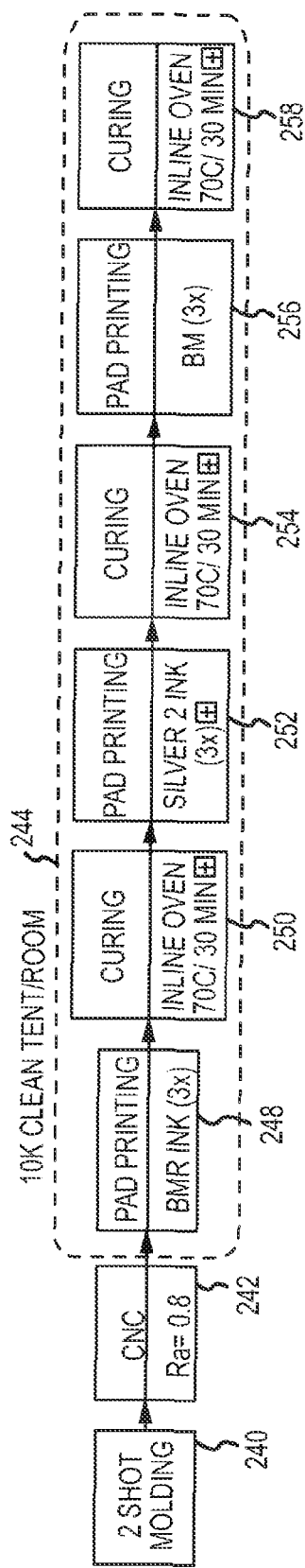
FIG. 18 is a flow chart illustrating a process of applying clear ink layers over a textured surface prior to applying a silver ink.

FIG. 18 illustrates an method 240 in which a smoothing material is applied to the textured surface before applying a high polish mirror ink. Again, a multishot process may be implemented to form the layers of the button (Block 242) and material may be removed through a CNC process (Block 244) to achieve a desired shape. Once the button has a desired geometry, the remainder of the steps may be performed in a clean environments, such as a 10K clean tent/room (Block 246). In the clean environment, the smoothing material may be applied through a pad printing process (Block 248). The smoothing material may be a clear ink, or lacquer and multiple layers (e.g., three layers) may be applied to achieve a desired smoothness. The clear ink may then be cured in an oven (Block 250). The clear coat ink may be obtained in a variety of suitable forms including, for example, Seiko SG 429, Seiko BMR, Seiko HSD, Seiko UV 5432, and/or Seiko UV 5410. Generally, multiple layers of the clear ink are applied, for example, two or three layers or more of clear ink may be applied. Typically, however, if too many layers are applied low level waviness appear. Further, if too few layers are applied, the machining marks remain visible. In some embodiments, a clear adhesive may be applied as a last clear coat. The oven may be an inline oven operating at a suitable temperature (e.g., approximately 70 degrees Celsius) and the button remains in the oven until the ink has cured (e.g., approximately 30 minutes). It should be appreciated that the curing temperatures and times may vary based on a variety of factors, such as the type of ink used and the number of layers applied, for example. As such, the times and temperatures given are merely provided as examples. Once the smoothing material has been applied and cured, a mirror ink may be applied via a pad printing process (Block 252). The mirror coating may take any suitable form of a printable ink resin with shiny particles suspended therein and may be similar in appearance to silver spray paint. In some embodiments, the mirror ink may be Seiko Mirror ink silver 2 and/or Seiko Mirror 608F, or the like. It is desirable, in some embodiments, to control the total thickness of the mirror ink coating. The thickness of the coating may be controlled by applying multiple layers of mirror ink (e.g., two to three layers or more, in some embodiments) or a single layer of variable thickness may be applied, depending on suitability to the coating processes. The mirror ink and the clear ink layers generally may be applied through a pad printing process. In some embodiments, one or more clear ink layers may be applied through a different process from one or more of the mirror ink layers. For example, one or more layers of clear ink may be applied by a pad printing process, while one or more layers of the mirror coating may be applied using a physical vapor deposition process. The mirror ink is cured in an inline oven, as before with the clear ink (Block 254).

In some embodiments, a backing material may be provided to cover and protect the mirror ink. In these embodiments, the backing material may be a black ink that is pad printed over the cured mirror ink (Block 256). The black ink may then be cured in an inline oven as with the prior curing steps (Block 258).

The use of the inline oven provides for better control of the ink curing parameters relative to the batch oven. Additionally, as there may be three separate curing processes, the processing time may increase over other methods. Additionally, the high gloss silver ink that is used for mirror feature in method 240 may need better surface quality and cleaner printing environment relative to other inks, such as gray ink. Moreover, as there may be several or many more layer of ink in the method 240, tighter process control and curing setup may be provided to avoid delamination.

Figure 19:
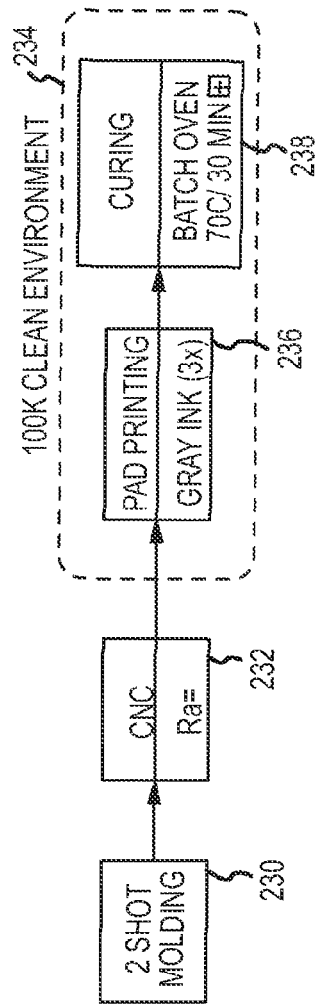
FIG. 19 is a flow chart illustrating an alternative process for applying a mirror feature in the button.

In some embodiments, the CNC processing provides a sufficiently smooth surface for a grey ink to be applied directly to the surface. This process is illustrated in FIG. 19. Initially, a two-shot molding process may form the two layers of the button (Block 230). Material may be removed from the layers to achieve the desired shape, for example, via a CNC process (Block 232). Once the button has the desired shape, it may be moved into a clean environment, such as a 100K clean room, for further processing (Block 234). The mirror feature may be pad printed onto the button (Block 236). The mirror feature may be formed by an ink that provides a reflective appearance, such as gray ink. One or more layers of ink may be applied and the ink may be cured in an oven (Block 238). In particular, the ink may be cured in a block oven for suitable length of time (e.g., approximately 30 minutes) at a suitable temperature (e.g., approximately 70 degrees Celsius).

Figure 20:
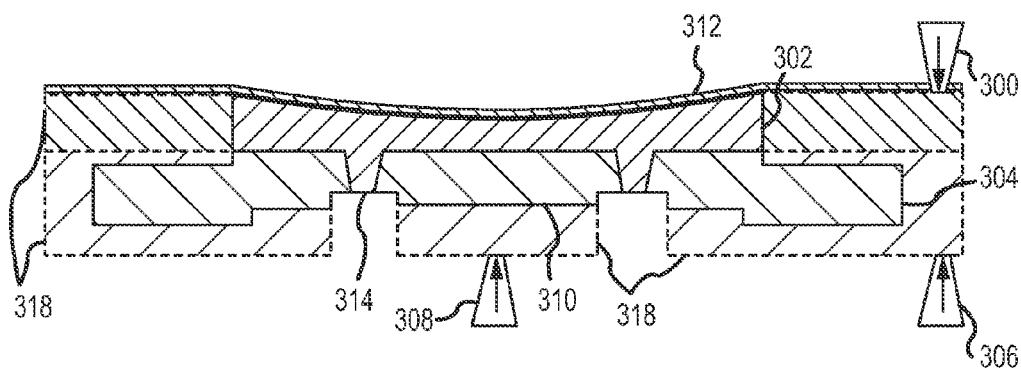
FIG. 20 illustrates a three-shot process for molding the button.
Figure 21:
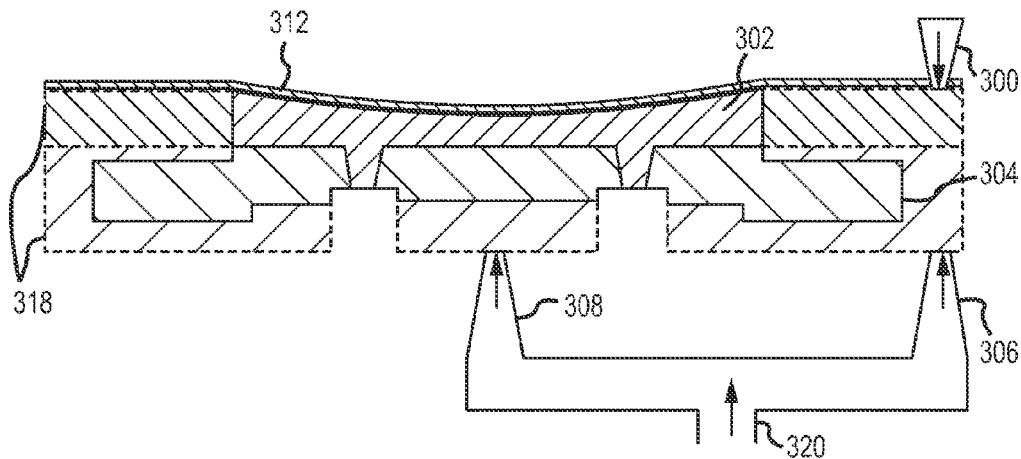
FIG. 21 illustrates the three-shot process for molding the button wherein the second and third gates are operated simultaneously.

In some embodiments, the surface onto which the mirror feature is applied may be molded smooth such that once molded, the surface does not require further processing. FIG. 20 illustrates an example molding process that provides as-molded icon geometry with a smooth surface. In particular, a 3-shot molding process is illustrated in FIG. 20. A first gate 300 provides the first shot which forms a transparent layer 302. A second gate 306 provides the second shot which forms a peripheral portion of an opaque, opaque layer 304. A third gate 308 provides the third shot which forms a center portion (the island) 310 of the opaque, opaque layer 304. As in other embodiments, a hardcoat 312 layer may be formed over the transparent layer 302. In some embodiments, the second and third gates may be operated in parallel with shared runners 320, as shown in FIG. 21.

A surface 314 for application of the mirror feature is smooth as molded and has the desired geometry. This process provides the surface 314 ready for application of a mirror finish and can reduce CNC cycle time. Other portions of the button 316 may require further processing to achieve a desired size and shape, however. In particular, CNC processing may remove excess material 318 and shape the button.

Figure 22:
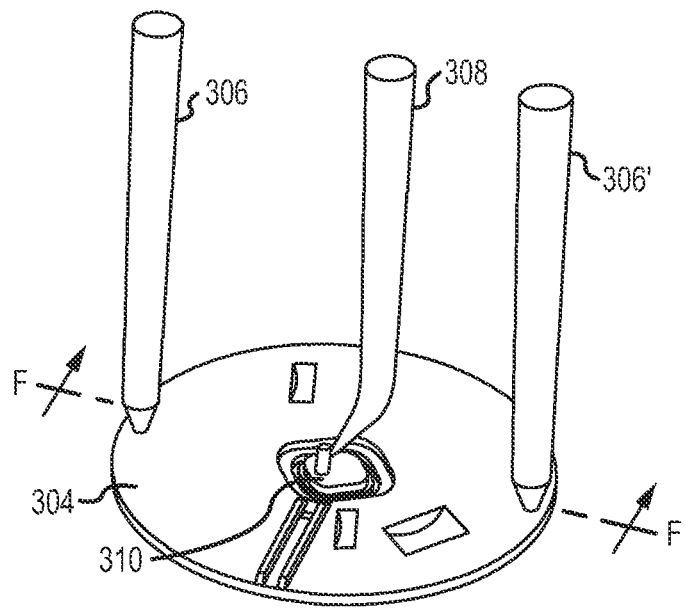
FIG. 22 is a perspective of the underside of the button showing three gates used for the second and third shots.
Figure 23:
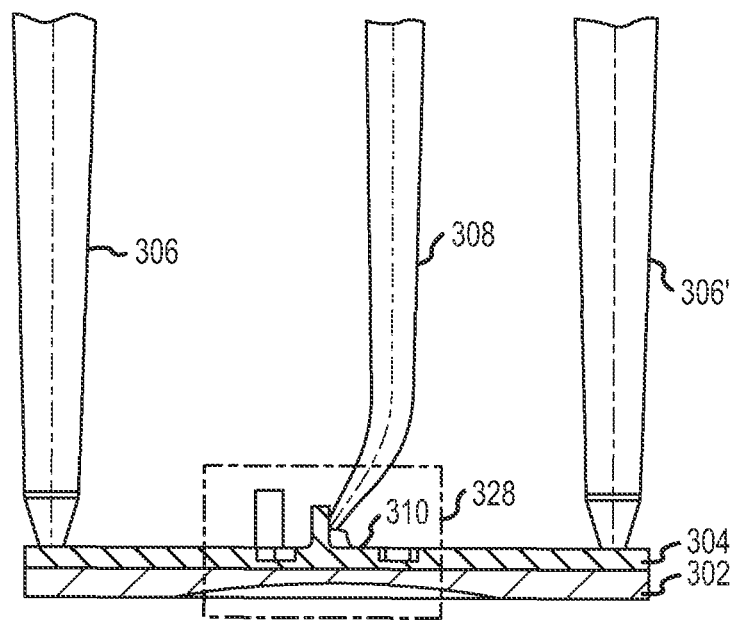
FIG. 23 is a cross-sectional view of FIG. 22 taken along line F-F.
Figure 24:
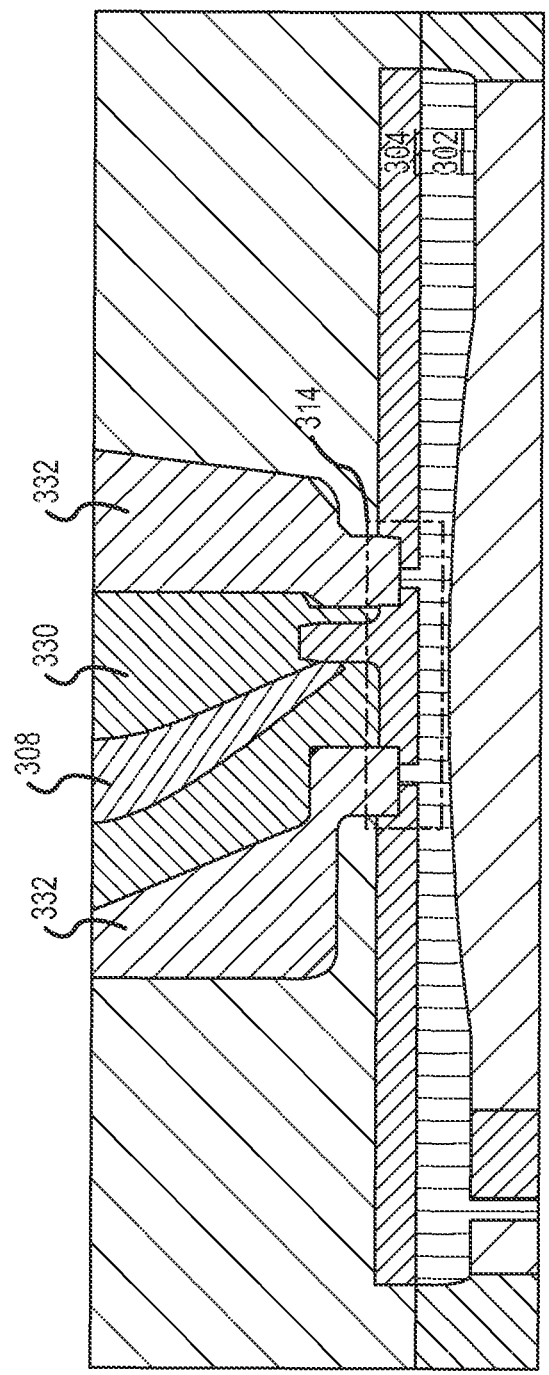
FIG. 24 is a zoomed view of a portion of FIG. 23 showing the molding interfacing the a surface so that it is smooth as-molded.

FIG. 22 shows three gates 306, 306', 308 being provided for molding of the opaque, opaque layer 304. Two of the three gates 306, 306' are used for the peripheral portion 322 of the opaque layer 304 while the gate 308 is used for the center island 310. The use of the two gates 306, 306' may provide more rapid filling of the mold. A cross-sectional view taken along line F-F in FIG. 22 is illustrated in FIG. 23. FIG. 24 is a zoomed view of area 328 of FIG. 23. As shown in FIG. 24, an air vent insert 330 is provided to allow air to escape as material is provided to create the center island 310. Additionally, a molding tool 332 interfaces with the surface 314 so that the surface 314 is suitable as-molded for application of mirror ink.

The three-shot process may provided improved surface finish and expedited manufacture, as it requires fewer steps relative to some of the other processes. In particular, the three-shot process may include molding a first shot clear plastic layer, mold a second shot opaque plastic layer and a third shot opaque plastic layer. In some embodiments, the second and third shot processes may be done in parallel with shared runners. A top surface may be painted with a hardcoat for scratch resistance. Excess plastic may be removed by CNC processes and the mirror feature (or icon) may be pad printed directly to the as-molded surface. In other embodiments, the mirror feature may take different forms and may be provided through different processes. For example, in one embodiment, the mirror feature may be provided via a physical vapor deposition process.

Figure 25:
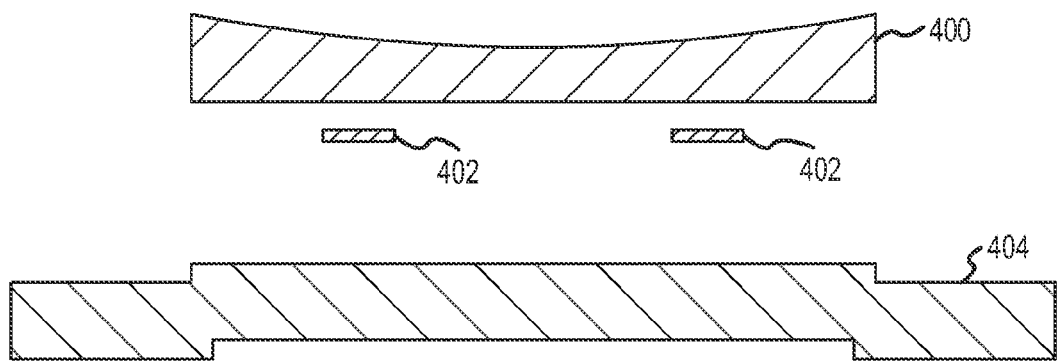
FIG. 25 is an exploded view of an insert molded button.
Figure 26:
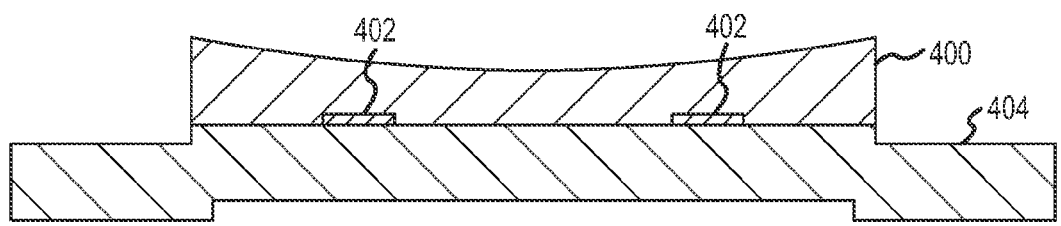
FIG. 26 illustrates the insert molded button of FIG. 25.

Other embodiments for providing a mirror feature may position the mirror feature in between a transparent layer and an opaque layer. An exploded view of a button 401 is illustrated in FIG. 25 to demonstrate an insert molding process to make the button 401 (FIG. 26) having the mirror feature embedded between two molded layers. In particular, the insert molding process may include molding a first clear shot to form a first layer 400. A mirror feature 402 or icon may be applied to the first layer 400. The mirror feature 402 may be applied in any suitable manner including, but not limited to, physical vapor deposition, print, metallic insert, and so forth. Subsequently, a second shot may be provided to form an opaque layer 404 that embeds the mirror feature 402 between the opaque layer and the clear layer 400. Finally, a CNC process may remove excess material to achieve a desired button geometry.

Figure 27:
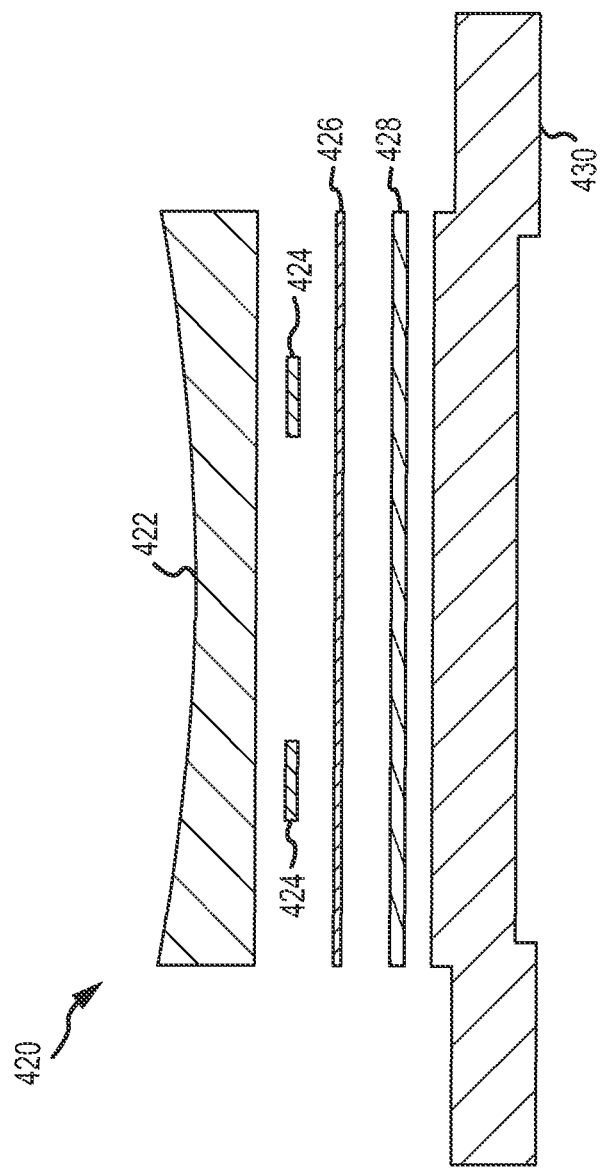
FIG. 27 illustrates an exploded view of an assembled button according an example embodiment.

Another method of manufacturing a button includes assembling the different parts of the button. FIG. 27 is an exploded view of button 420 that is assembled. Initially, a clear layer 422 of the button is formed and the mirror feature 424. An opaque back print 426 is provided over the mirrored feature 424. An adhesive 428 allows for the clear layer 422 and the mirrored feature 424 to be assembled to an opaque back 430. In some embodiments, the clear layer 422 may take the form of a glass or acrylic material.

Generally, among the various processes described above, the two-shot molding is relatively easy to mold compared to the three-shot molding process. However, in the 2-shot process CNC removal of material may leave a rough surface and the CNC processing may be extensive. In the three-shot process, the surface for the mirror feature is smooth as molded and, thus reducing the amount of CNC processing.

The insert molding process allows for the mirror feature to be embedded in plastic and it is relatively easy to mold. Further, the mirror feature may be insert molded or painted and so forth. However, it may be difficult to control flashing in the insert molding process and to prevent distortion or movement of the mirror feature during subsequent processing. Thus, placement of the mirror feature may be difficult to control. In the assembled button, the molding is simple and there is great flexibility in material choice. However, alignment of the layers may be difficult and visual depth is not possible.

Once the button has a desired shape and the surface is suitable for application of the mirror feature or icon, there are various different ways in which the mirror feature may be applied. Specifically, physical vapor deposition (PVD), mirror insert and printed or screened ink may be implemented. PVD provides an excellent finish with a very low profile and several different metals may be used. However, PVD is very unforgiving of defects in the surface, so the surface preferably is mirror polished, and the equipment is expensive. PVD is suitable for coating a true mirror finish surface such as those achievable in the aforementioned assembled surfaces, highly polished surfaces, or as-molded surfaces. The mirror insert process may be suitable for insert molding, hot pressing, and assembled buttons. There are a variety of different ways in which the finish can be achieved, including PVD, printing and so forth, however, it is difficult to control the placement of the insert. Printed or screened ink, such as reflective particles suspended in a binding ink or resin as suitable for all options and non-mirror polish surfaces. However, it is not a true mirror finish. Rather, it is simply reflective.

The foregoing describes some example embodiments for creating a smooth surface suitable for applying a mirror feature. Although the foregoing discussion has presented specific embodiments, persons skilled in the art will recognize that changes may be made in form and detail without departing from the spirit and scope of the embodiments. For example, other techniques may be used to smooth the machined surface. For example, abrasive polishing, stone polishing, grindings, localized heating (e.g. with a laser), and vapor polishing, among other techniques, may be used. Additionally, in some embodiments, the layers of the button may be joined by adhesion using glue, adhesive, thermal bonding film, or another suitable method. Further, the mirror coating may take the form of a mirror-like foil sheet. Accordingly, the specific embodiments described herein should be understood as examples and not limiting the scope thereof.

The invention claimed is:

1. A button comprising:
a transparent layer;
an opaque layer coupled to the transparent layer and defining an opening through which a portion of the transparent layer extends; and
an opaque reflective element positioned at an end of the opening and having a surface coupled to the transparent layer, wherein:
a majority of the surface is visible through the opening and a remaining portion of the surface is coupled to the opaque layer and is not visible through the opening.

2. The button of claim 1, wherein the opaque reflective element is an insert-molded metallic object.

3. The button of claim 1, wherein the opaque reflective element is a coating.

4. The button of claim 3, wherein the transparent layer is glass and wherein the button further comprises an adhesive between the transparent and opaque layers.

5. The button of claim 1, wherein the opaque reflective element is adhered to the transparent layer.

6. The button of claim 5, wherein the opaque reflective element is a foil.

7. The button of claim 5, wherein the opaque reflective element is metallic.

8. The button of claim 1, further comprising a scratch resistant surface coupled to at least a portion of the transparent layer.

9. The button of claim 1, wherein the opaque reflective element includes at least one ink layer.

10. The button of claim 1, wherein the transparent layer comprises a single material.

11. A button comprising:
an opaque layer defining an opening that extends through the opaque layer;
a transparent layer positioned over the opaque layer and extending into the opening; and
one or more opaque mirror coating layers positioned at an end of the opening and having a surface coupled to the transparent layer, wherein:
a majority of the surface is visible through the transparent layer and a remaining portion of the surface is coupled to the opaque layer and is not visible through the transparent layer.

12. The button of claim 11 further comprising a clear coating layer separating the transparent layer and the one or more opaque mirror coating layers.

13. The button of claim 12, wherein the opaque layer comprises a plurality of distinct regions formed from a single distinct region by a subtractive process.

14. The button of claim 12, wherein the opaque mirror coating is applied by a vapor deposition process.

15. The button of 11, wherein a surface of the portion of the transparent layer is formed by a surface of an injection molding tool.

16. The button of claim 11, further comprising a scratch resistant surface coupled to at least a portion of the transparent layer.

17. The button of claim 11, wherein the one or more opaque mirror coating layers include at least one ink layer.

18. The button of claim 11, wherein the transparent layer comprises a single material.

19. A portable electronic device, comprising:
a housing; and
a multilayer plastic button, comprising:
an opaque layer that has an upper surface, a lower surface, and a side surface, the opaque layer defining an aperture that extends from the upper surface to the lower surface;
a flange extending from the side surface of the opaque layer that couples the multilayer plastic button to the housing;
a transparent layer coupled to a portion of the upper surface of the opaque layer and extending through the aperture; and
a fully reflective mirror feature positioned at an end of the aperture and having a surface coupled to the transparent layer wherein a majority of the surface is visible through the aperture and a remaining portion of the surface is coupled to the opaque layer and is not visible through the transparent layer.

20. The portable electronic device of claim 19, wherein the aperture is a tapered aperture and the projection is a tapered projection.

21. The portable electronic device of claim 20, wherein the tapered aperture is wider at the upper surface and narrower at the lower surface.

22. The portable electronic device of claim 19, wherein the fully reflective mirror feature is coupled to a portion of the lower surface.

23. The portable electronic device of claim 19, wherein an upper surface of the flange is recessed below the upper surface of the opaque layer to define a shelf.

24. A key cap for a keyboard comprising:
an opaque material defining an opening having a shape that corresponds to a symbol,
a transparent material positioned over the opaque material and extending into the opening; and
an opaque reflective element positioned at a bottom of the opening and having a surface coupled to the transparent material, wherein a majority of the surface is visible through the opening and a portion of the surface is coupled to the opaque material and is not visible through the opening.

25. The key cap of claim 24, further comprising a support mechanism coupled to the opaque material.

26. The key cap of claim 24, wherein the majority of the surface forms a symbol.

\* \* \* \* \*